(12) United States Patent
Tanimura et al.

(10) Patent No.: US 7,808,154 B2
(45) Date of Patent: Oct. 5, 2010

(54) ACTUATOR UNIT, DRIVING DEVICE FOR INFORMATION RECORDING/READING HEAD, INFORMATION RECORDING/READING APPARATUS, AND METHOD FOR DRIVING THE ACTUATOR UNIT

(75) Inventors: Yasutaka Tanimura, Takatsuki (JP); Shigeaki Tochimoto, Ibaraki (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 193 days.

(21) Appl. No.: 12/008,755

(22) Filed: Jan. 14, 2008

(65) Prior Publication Data

US 2008/0174901 A1    Jul. 24, 2008

(30) Foreign Application Priority Data

Jan. 19, 2007    (JP) ............................ 2007-010009
Jan. 8, 2008    (JP) ............................ 2008-001073

(51) Int. Cl.
   *G11B 15/00*    (2006.01)
(52) U.S. Cl. .................. 310/323.16; 310/317; 360/72.1
(58) Field of Classification Search ............... 360/72.1; 310/323.16, 317
   See application file for complete search history.

(56) References Cited

U.S. PATENT DOCUMENTS

| 4,167,763 | A | * | 9/1979 | Kubota | ..................... 360/77.16 |
| 2003/0112547 | A1 | * | 6/2003 | Koso et al. | ............... 360/78.05 |
| 2005/0030325 | A1 | * | 2/2005 | Sugiyama et al. | .............. 347/5 |
| 2005/0112278 | A1 | * | 5/2005 | Obata et al. | ................. 427/231 |
| 2006/0108964 | A1 | * | 5/2006 | Shibatani | ..................... 318/685 |
| 2006/0170718 | A1 | * | 8/2006 | Takahashi et al. | .............. 347/7 |

FOREIGN PATENT DOCUMENTS

| JP | 2001-222869 A | 8/2001 |
| JP | 2004-274837 A | 9/2004 |

* cited by examiner

*Primary Examiner*—Walter Benson
*Assistant Examiner*—Bryan P Gordon
(74) *Attorney, Agent, or Firm*—Sidley Austin LLP

(57) ABSTRACT

An actuator unit including a friction drive actuator, a driving device for information recording/reading head, an information recording/reading apparatus and a method for driving the actuator unit which can achieve both high precision and high speed is provided by waiting the residual vibration to attenuate or forcibly attenuating the residual vibration to achieve high speed positioning by driving the friction drive actuator in the expansion and contraction mode after a high speed movement in the resonant drive mode.

10 Claims, 12 Drawing Sheets

ACTUATOR UNIT, DRIVING DEVICE FOR INFORMATION RECORDING/READING HEAD, INFORMATION RECORDING/READING APPARATUS, AND METHOD FOR DRIVING THE ACTUATOR UNIT

This application is based on Japanese Patent Application No. 2007-010009 filed on Jan. 19, 2007, and No. 2008-1073 filed on Jan. 8, 2008, in Japanese Patent Office, the entire content of which is hereby incorporated by reference.

TECHNICAL FIELD

The present invention relates to an actuator unit, a driving device for information recording/reading head, an information recording/reading apparatus and a method for driving the actuator unit. The present invention relates in particular to an actuator unit having a resonant drive mode and an expansion and contraction drive mode, the driving device for the information recording/reading head, the information recording/reading apparatus, and a method for driving the actuator unit.

BACKGROUND

In recent years, there has been a demand for increase in recording density and reduction in the seek time required for data recording/reading with the increase in recording volume of recording medium in the information recording/reading apparatuses such as a hard disk device, optical disk device and the like. For this reason, there has been a demand for increase in precision for higher recording density and higher speed for reducing seek time in the field of the information recording/reading head of the information recording/reading apparatus (herein after referred to as head driving device) as well.

As a result, it has been proposed that a friction drive actuator which uses a piezoelectric element which is a type of electromechanical conversion element is employed as the actuator of the head driving device in order to obtain both high precision and high speed. For example, a head driving device which includes two driving methods has been proposed. The driving methods are the high speed driving method (hereinafter referred to as resonant drive method) using resonance of the piezoelectric element, the method in which the displacement amount is large (about a few μm) and the high precision driving method (hereinafter referred to as expansion and contraction drive method) using expansion and contraction of the piezoelectric element, the method in which displacement amount is small (about a few nm) (see Unexamined Japanese Patent Application Publication No. 2001-222869 for example). Similarly, as an actuator drive method with high speed and high accuracy, there has been proposed a method in which the head is rapidly driven to the vicinity of a target position by resonant drive method and then is accurately positioned by expansion and contraction drive method (see Unexamined Japanese Patent Application Publication No. 2004-274837 for example).

However, as shown in FIG. 12, in resonant drive method, even if resonant drive ends at timing T1, some vibration remains for a while in the actuator after that, and this attenuates with time T. Thus in the methods of Unexamined Japanese Patent Application Publication No. 2001-222869 and Unexamined Japanese Patent Application Publication No. 2004-274837, there is a problem as follows. When the friction drive actuator is subjected to the expansion and contraction drive in a state where the vibration like the vibration after Timing T1 in FIG. 12 remains, minute displacement in the expansion and contraction drive is affected by the residual vibration, and accurate positioning can not be achieved.

SUMMARY

The present invention is conceived in view of foregoing. An object of the present invention is to provide a method for driving an actuator unit as well as an actuator unit, a driving device for information recording/reading head, an information recording/reading apparatus and a method for driving the actuator unit which include a friction drive actuator capable of both high precision and high speed needed for, for example, a driving device for head in an information recording/reading apparatus and the like.

In view of foregoing, one embodiment according to one aspect of the present invention is an actuator unit, comprising:
a friction drive actuator which is powered by an electromechanical conversion element;
a drive section which has a resonant drive mode and an expansion and contraction drive mode as a drive mode for driving the friction drive actuator, wherein in the resonant drive mode, the friction drive actuator is vibrated in resonance, and in the expansion and contraction drive mode, the friction drive actuator is expanded and contracted; and
a control section which switches the drive mode from the resonant drive mode to the expansion and contraction drive mode,
wherein when the control section switches the drive mode from the resonant drive mode to the expansion and contraction drive mode, the control section terminates the resonant drive mode and then starts the friction drive mode after an amplitude of a residual vibration of the friction drive actuator has decayed to a predetermined value.

According to another aspect of the present invention, another embodiment is a driving device for driving an information recording/reading head, the method comprising:
an actuator unit which drives the information recording/reading head, the actuator unit including:
  a friction drive actuator which is powered by an electromechanical conversion element;
  a drive section which has a resonant drive mode and an expansion and contraction drive mode as a drive mode for driving the friction drive actuator, wherein in the resonant drive mode, the friction drive actuator is vibrated in resonance, and in the expansion and contraction drive mode, the friction drive actuator is expanded and contracted; and
  a control section which switches the drive mode from the resonant drive mode to the expansion and contraction drive mode,
  wherein when the control section switches the drive mode from the resonant drive mode to the expansion and contraction drive mode, the control section terminates the resonant drive mode and then starts the friction drive mode after an amplitude of a residual vibration of the friction drive actuator has decayed to a predetermined value.

According to another aspect of the present invention, another embodiment is an information recording/reading apparatus, comprising:
a driving device for driving an information recording/reading head, the driving device including:
  an actuator unit which drives the information recording/reading head, the actuator unit having:
    a friction drive actuator which is powered by an electromechanical conversion element;

a drive section which has a resonant drive mode and an expansion and contraction drive mode as a drive mode for driving the friction drive actuator, wherein in the resonant drive mode, the friction drive actuator is vibrated in resonance, and in the expansion and contraction drive mode, the friction drive actuator is expanded and contracted; and a control section which switches the drive mode from the resonant drive mode to the expansion and contraction drive mode, wherein when the control section switches the drive mode from the resonant drive mode to the expansion and contraction drive mode, the control section terminates the resonant drive mode and then starts the friction drive mode after an amplitude of a residual vibration of the friction drive actuator has decayed to a predetermined value.

According to another aspect of the present invention, another embodiment is a method for driving an actuator unit, the method comprising the steps of:

driving a friction drive actuator by causing resonant vibration of a friction drive actuator, the friction drive actuator being powered by an electromechanical conversion element;

driving the friction drive actuator by causing expansion and contraction of the friction drive actuator; and switching from the step of driving by resonant vibration to the step of driving by expansion and contraction, wherein in the step of switching, the step of driving by expansion and contraction is started when an amplitude of a residual vibration of the friction drive actuator has decayed to no greater than a predetermined value after terminating the step of driving by resonant vibration.

DETAILED DESCRIPTION OF THE PREFERRED EMBODIMENT

Figure 1:
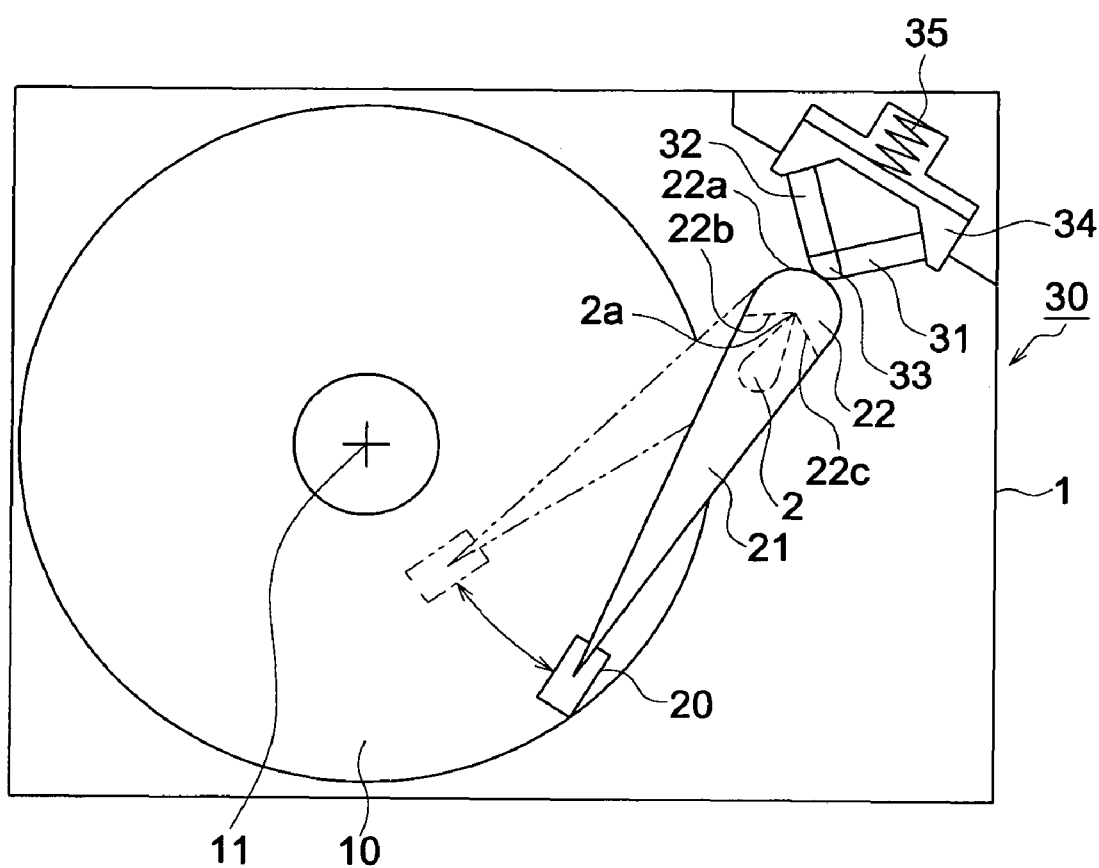
FIG. 1 is a pattern diagram showing the structure of the hard disk using the friction drive actuator.

The following is a description of the present invention based on an embodiment in the drawing, but the present invention is not to be limited to this embodiment. It is to be noted that the same or similar portions in the diagrams have been assigned the same number, and repeated descriptions thereof have been omitted.

First, referring to FIG. 1 there is described a hard disk device which is an example of the information recording/reading apparatus using a friction drive actuator which is an important part of the actuator unit of an embodiment according to the present invention. FIG. 1 is a pattern diagram showing the structure of the hard disk using the friction drive actuator.

In FIG. 1, the hard disk device 1 comprises a recording medium 10 which rotates about a rotating shaft 11; an arm 21; and a truss actuator 30 which is an example of the friction drive actuator. The arm 21 has a recording/reading head such as a recording head 20 at the first end and has a bearing 22 at the second end. The truss actuator 30 is in contact with the end surface of the arm 21 on the bearing 22 side and rotates the arm 21 about the bearing 22 using a frictional force. The structure of the friction drive actuator is described in detail in FIG. 2a and FIG. 2b.

By driving the friction drive actuator 30 using the drive method described hereinafter, the arm 21 is frictionally driven by the friction drive actuator 30, and rotates about the center of the bearing 22, and the recording head 20 is moved in the direction along the normal line from the rotation shaft 11 of the recording medium 10, and the position of the recording head 20 on the recording medium 10 is moved.

Figure 2A:
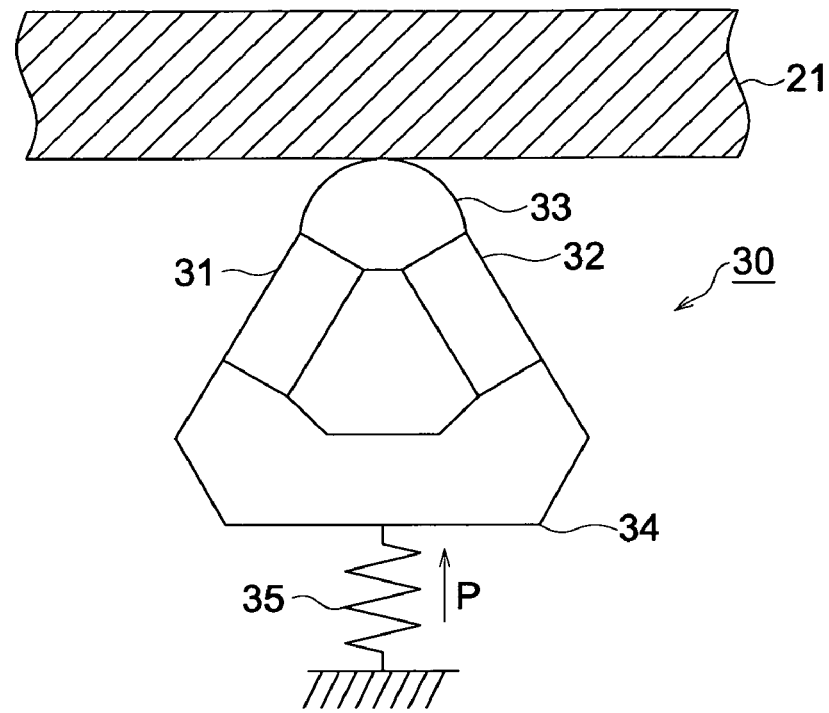
FIGS. 2a and 2b are pattern diagrams showing examples of the structure of the friction drive actuator.
Figure 2B:
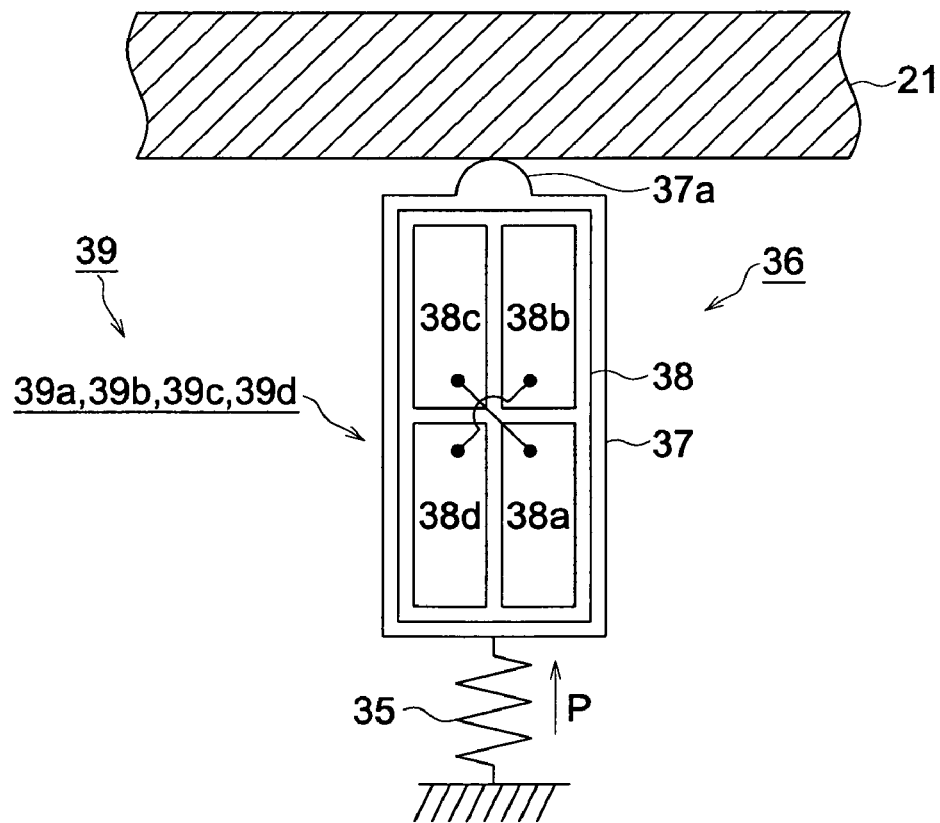

Next, the structure and operation of the foregoing friction drive actuator will be described using FIG. 2a-FIG. 4c. FIGS. 2a and 2b are pattern diagrams showing an example of the structure of the friction drive actuator, and FIG. 2a shows the truss actuator 30, while FIG. 2b shows the segmented electrode actuator 36.

In FIG. 2a, the truss actuator 30 comprises: a tip 33, layered or roll piezoelectric elements 31 and 32; a base 34; a spring 35 and the like. The tip 33 is a friction member that contacts the end surface of an object to be driven such as the arm 21 and the like. In the piezoelectric elements 31 and 32, the first end is mounted to the tip 33 at a predetermined angle, using a method such as adhesion, while the second end is mounted and supported on the base 34 using a method such as adhesion. The spring 35 is an urging member that urges the tip 33 against the end surface of the arm 21 with the pressing force P to bring the tip 33 into contact with the arm 21 by urging the base 34 in the direction toward the arm 21 with the pressing force P. The piezoelectric elements 31 and 32 are the electromechanical conversion elements of the present invention.

Figure 3A:
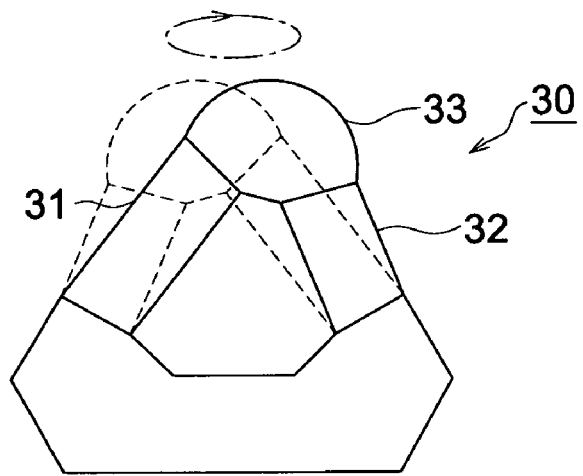
FIGS. 3a, 3b and 3c are pattern diagrams for explaining the operation of a truss actuator.
Figure 3B:
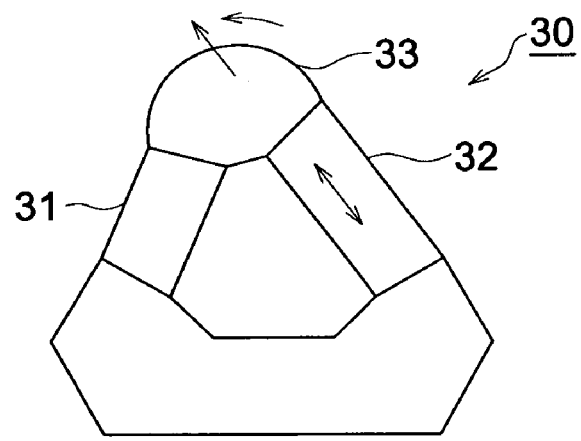
Figure 3C:
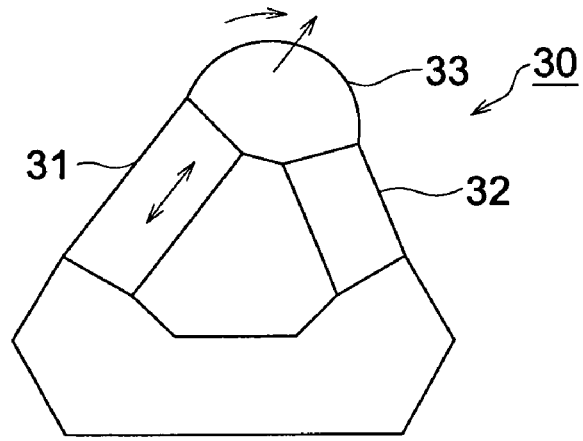

FIGS. 3a, 3b and 3c are pattern diagrams for describing the operation of the truss actuator 30. FIG. 3a shows the state of drive in the resonant drive mode, while FIG. 3b and FIG. 3c show the state of drive in the expansion and contraction drive mode.

In FIG. 3a, in the resonant drive mode, when the truss actuator 30 is driven by the resonant drive mode at a frequency in the vicinity of the resonant frequency of the entire drive system including the truss actuator 30, a resonant vibration is caused by the repetition of the state in which piezoelectric element 31 expands (contracts) and the piezoelectric element 32 contracts (expands) with an appropriate phase difference. As a result, the front end of the tip 33 moves elliptically. This elliptical movement is transmitted to the object to be driven due to friction, and the object to be driven moves.

Meanwhile, in the expansion and contraction drive mode, as shown in FIG. 3b, by expanding only the piezoelectric element 32, or alternatively by expanding the piezoelectric element 32 and contracting the piezoelectric element 31 at the same time, the front end of the tip 33 is displaced to the left side. Conversely, by expanding only the piezoelectric element 31, or alternatively by expanding the piezoelectric element 31 and contracting the piezoelectric element 32 at the same time, as shown in FIG. 3c, the front end of the tip 33 is displaced to the right side. This displacement is transmitted to the object to be driven by friction, and the object to be driven is thereby moved. The amount of displacement due to the expansion and contraction drive mode is very small as, for example, 1/1000 of the amplitude of resonant drive mode, and is suitable for high precision positioning and the like. The expansion and contraction drive mode can be executed not only by the expansion and contraction of a piezoelectric element but by the impact drive of the piezoelectric element. In that case, by repeatedly driving the actuator with different displacement speeds between the rightward displacement and the leftward displacement, there can be realized the rightward and leftward driving of the object to be driven by a smaller pitch than the resonant drive mode.

Referring back to FIG. 2b, the segmented electrode actuator 36 is a thin plate actuator which comprises a vibration plate 37, a piezoelectric plate 38, a piezoelectric plate 39 that is not shown, and a spring 35. The vibration plate 37 has, at the first end thereof, a tip portion 37a which is the friction member that contacts the end surface of the object to be driven such as the arm 21 or the like. The piezoelectric element 38 is a thin ceramic plate mounted on one surface of the vibration plate 37 by adhesive and the like and has electrodes 38a, 38b, 38c and 38d which are divided into four regions. Similarly, the piezoelectric element 39 is a thin ceramic plate mounted by adhesive and the like on the vibration plate 37 at the position facing the piezoelectric element 38 with the vibration plate 37 between them.

The spring 35 is an urging member which urges the second end of the vibration plate 37 opposite to the first end in the direction toward the arm 21 with the pressing force P and urges the tip portion 37a to bring it in contact with the end surface of the arm 21 with the pressing force P.

The structure shown herein has four segmented electrodes 38a, 38b, 38c and 38d on single piezoelectric element 38, but alternatively, four discrete piezoelectric elements having electrodes 38a, 38b, 38c and 38d respectively thereon may be arranged in the same manner as in FIG. 2b on the vibrating plate 37. This also applies to the piezoelectric element 39. In the example of FIG. 2b, a total of 8 plate-like piezoelectric elements are arranged on both surfaces of the vibrating plate 37.

In the piezoelectric element 38, the electrode 38a and the electrode 38c are electrically connected, where they are positioned at the diagonal position on the surface of the piezoelectric element 38, and similarly, the electrode 38b and the electrode 38d are electrically connected, where they are positioned at the diagonal position on the surface of the piezoelectric element 38. In the same manner, as for the piezoelectric element 39, the electrode 39a and the electrode 39c are electrically connected, where they are positioned at the diagonal position on the surface of the piezoelectric element 39, and similarly, the electrode 39b and the electrode 39d are electrically connected, where they are positioned at the diagonal position on the surface of the piezoelectric element 39.

Furthermore, the electrode 38a and the electrode 39a are electrically connected, where they are positioned facing each other with the vibration plate 37 between them, and similarly, the electrode 38b and the electrode 39b are electrically connected, where they are positioned facing each other with the vibration plate 37 between them.

Figure 4A:
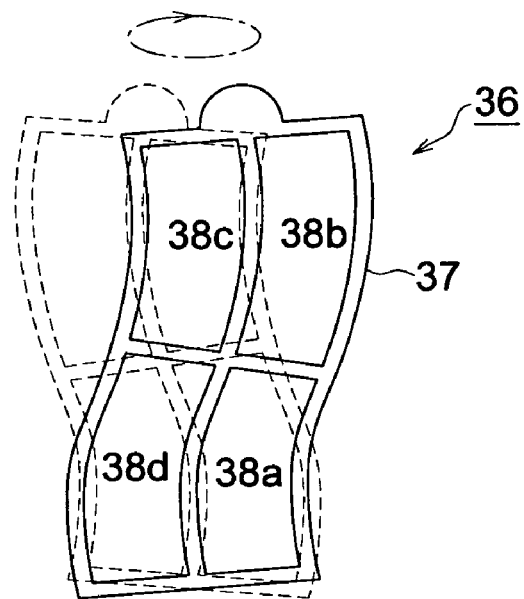
FIGS. 4a, 4b and 4c are pattern diagrams for explaining the operation a segmented electrode actuator.
Figure 4B:
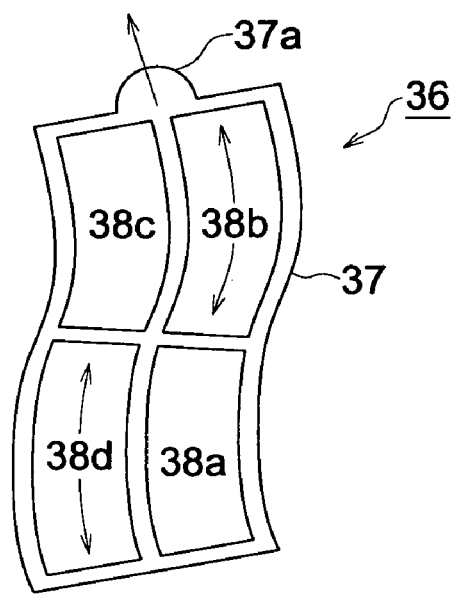
Figure 4C:
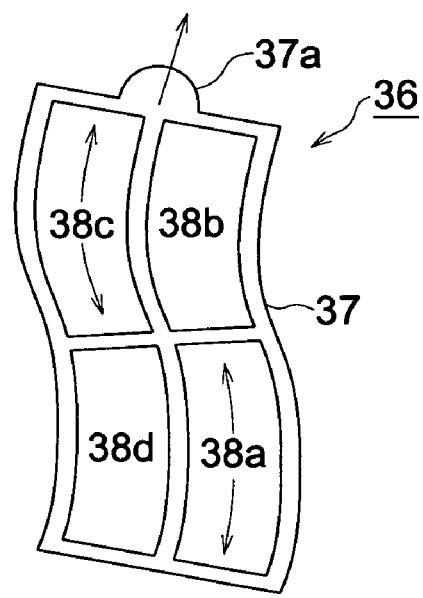

FIGS. 4a, 4b and 4c are pattern diagrams for explaining the operation of a segmented electrode actuator. FIG. 4a shows the state of drive in the resonant drive mode, while FIG. 4b and FIG. 4c show the state of drive in the expansion and contraction drive mode. In order to facilitate viewing, the piezoelectric element 38 is not shown, and only the vibration plate including the tip portion 37a and the four segmented electrodes 38a, 38b, 38c and 38d are shown.

In FIG. 4a, in the resonant drive mode, when the segmented electrode actuator 36 is driven in resonance at a frequency in the vicinity of the resonant frequency of the entire drive system including the segmented electrode actuator 36, a resonant vibration is caused by the repetition of the state in which the piezoelectric elements underneath the electrode 38a and 38c of the piezoelectric element 38 and the piezoelectric elements underneath the electrode 39a and 39c, which are not shown, expand (contract) and the piezoelectric elements underneath the electrodes 38b and 38d and the piezoelectric elements of the electrodes 39b and 39d, which are not shown, contract (expand) with an appropriate phase difference. As a result, the front end of the tip portion 37a moves elliptically. This elliptical movement is transmitted to the object to be driven due to friction, and the object to be driven moves.

Meanwhile, in the expansion and contraction drive mode, as shown in FIG. 4b, by expanding only the piezoelectric elements underneath the electrodes 38b and 38d of the piezoelectric element 38 and the piezoelectric elements underneath the electrodes 39b and 39d, which are not shown, or alternatively, by expanding piezoelectric elements underneath the electrodes 38b and 38d of the piezoelectric element 38 and the piezoelectric elements underneath the electrodes 39b and 39d, which are not shown, while contracting the piezoelectric elements underneath the electrodes 38a and 38c and the piezoelectric elements underneath the electrode 39a and 39c, which are not shown, the front end of the tip 37a is displaced to the left side.

Conversely, by only expanding the piezoelectric elements underneath the electrodes 38a and 38c of the piezoelectric element 38 and the piezoelectric elements underneath the electrodes 39a and 39c, which are not shown, or alternatively, by expanding the piezoelectric elements underneath the electrodes 38a and 38c of the piezoelectric element 38 and the piezoelectric elements underneath the electrodes 39a and 39c, which are not shown, while contracting the piezoelectric elements underneath the electrodes 38b and 38d and the piezoelectric elements underneath the electrodes 39b and 39d, which are not shown, as shown in FIG. 4c, the front end of the tip 37a is displaced to the right side. This displacement is transmitted to the object to be driven by friction, and the object to be driven is thereby moved. The amount of displacement due to the expansion and contraction drive is very small as, for example, 1/1000 of the amplitude of resonant drive and is suitable for high precision positioning and the like. The expansion and contraction drive mode can be executed not only by the expansion and contraction of a piezoelectric element but by the impact drive of the piezoelectric element. In that case, by repeatedly driving the actuator with different displacement speeds between the rightward displacement and the leftward displacement, there can be realized the rightward and leftward driving of the object to be driven by a smaller pitch than the resonant drive mode.

It is to be noted that the segmented electrode actuator 36 shown in FIG. 2b and FIGS. 4a, 4b and 4c is described in detail in "International Patent Publication No. WO2003/075445 as a vibrating body for a linear actuator.

The present invention is not limited to use in the truss actuator 30 and the segmented actuator 36 shown in FIGS. 2a and 2b, and may be suitably applied to all other friction drive actuators, but in the description below, the truss actuator 30 is described as a typical example of friction drive actuators.

Figure 5:
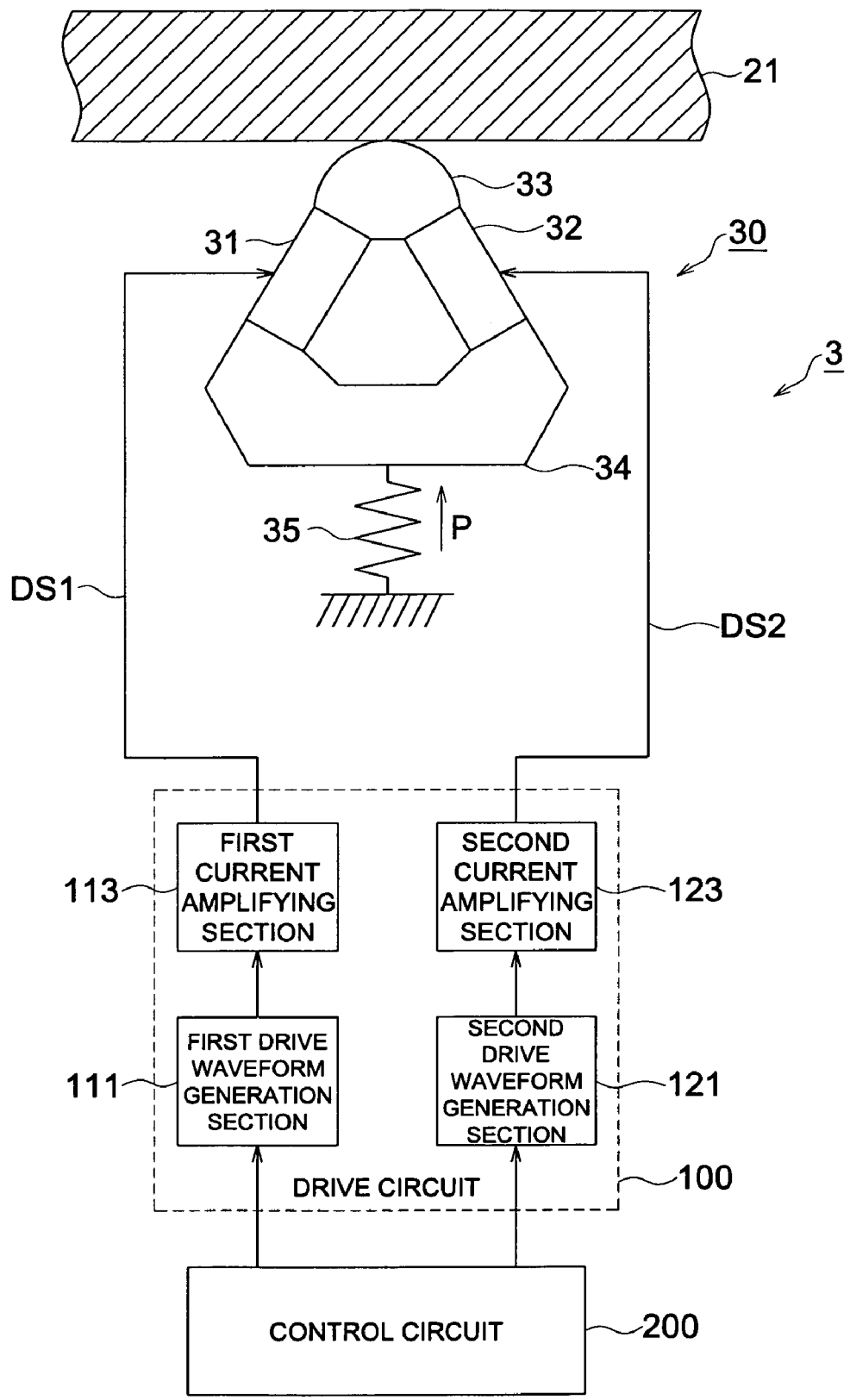
FIG. 5 is a block diagram showing an example of the actuator unit structure.

Next, the structure of an actuator unit according to an embodiment of the present invention will be described using FIG. 5. FIG. 5 is a block diagram showing an example of a structure of the actuator unit.

In FIG. 5, the actuator 3 comprises a truss actuator 30, a drive section such as a drive circuit 100 and a control section such as a control circuit 200. The truss actuator 30 is the same as shown in FIG. 2a. The layered piezoelectric element 31 and 32 of the truss actuator 30 are driven by the drive circuit 100 and the control circuit 200. The control circuit 200 may comprise a microcomputer and memory for example, and it generally controls the driving scheme of the truss actuator 30.

The drive circuit 100 comprises: a first waveform generation section 111; a first current amplifying section 113; a second waveform generation section 121; and a second current amplifying section 123. The first waveform generation section 111 generates a drive waveform for the piezoelectric element 31; the waveform is current-amplified by the first current amplifying section 113 to be the drive signal DS1, which is applied to the piezoelectric element 31. Similarly, the second waveform generation section 121 generates a drive waveform for the piezoelectric element 32; the waveform is current-amplified by the second current amplifying section 123 to be the drive signal DS2, which is applied to the piezoelectric element 32.

Figure 6:
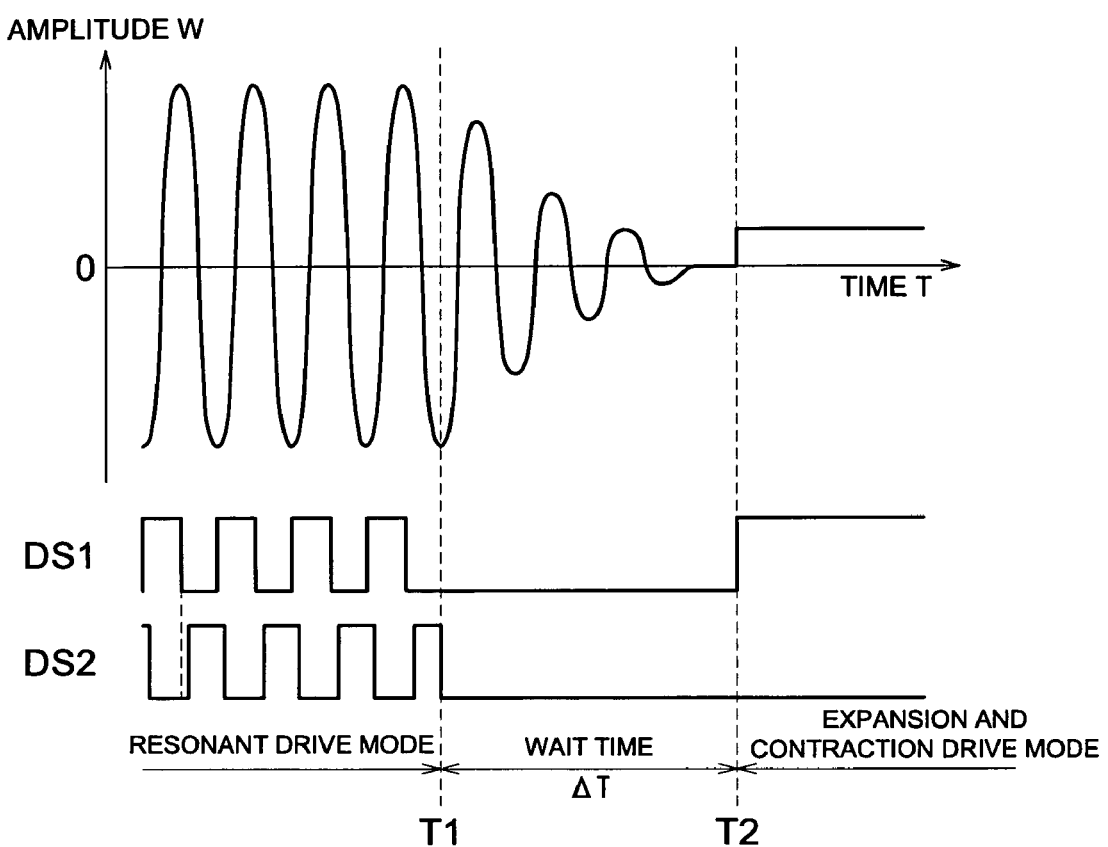
FIG. 6 is a pattern diagram for explaining the first embodiment of the driving method of the friction drive actuator according to the present invention.

Next, the first embodiment of the drive method for the friction drive actuator of the present invention will be described referring to FIG. 6. FIG. 6 is a pattern diagram of the vibration waveform of the friction drive actuator for explaining the first embodiment of the driving method of the friction drive actuator according to the present invention. In the first embodiment, by providing a wait time between the resonant drive and the expansion and contraction drive, the problem that the residual vibration affects the expansion and contraction drive is reduced.

In FIG. 6, the time period before timing T1 is the driving state in the resonant drive mode (resonant drive step), and the drive signal DS1 and DS2 are applied to piezoelectric 31 and 32 of the truss actuator 30 by the drive circuit 100, and the truss actuator 30 is vibrating in resonance. The drive signals DS1 and DS2 are, for example, rectangular waves with an appropriate phase difference between each other at the frequency in the vicinity of resonant frequency of the truss actuator 30. Alternatively, there can be a sinusoidal waveform instead of the rectangular waveform. Even if the control signal from the control circuit 200 is input into the drive circuit 100 to terminate the application of the drive signals DS1 and DS2, the residual vibration remains for a while in the truss actuator 30, and the amplitude W attenuates with time T.

A wait time is provided by the control circuit 200 for a predetermined time ΔT from the timing T1 (switching step). The predetermined time ΔT is the wait time required for the amplitude of the residual vibration to attenuate no greater than the value (hereinafter referred to as predetermined value) at which the amplitude W of the residual vibration has substantially no effect on the drive precision in the expansion and contraction drive method. After the predetermined time ΔT elapses, a drive signal for driving by expansion and contraction the truss actuator 30 is output from the drive circuit 100 (expansion and contraction drive step). For example, the drive signal DS1 is output, and the piezoelectric element 31 contracts, and as shown in FIG. 3c, the tip 33 is displaced rightward.

As described above, according to the first embodiment of the drive method for the friction drive actuator of one embodiment of the present invention, by performing expansion and contraction drive after providing a wait time of the predetermined time ΔT that is required for the amplitude W of the residual vibration to attenuate no greater than the predetermined value after the resonant drive stops, solved is the problem that an accurate positioning is impossible because of an influence of the residual vibration affecting a minute displacement of the expansion and contraction drive. Thus, an actuator unit, a driving device for information recording/reading head, an information recording/reading apparatus and a method for driving the actuator unit including a friction drive actuator can be provided.

Figure 7A:
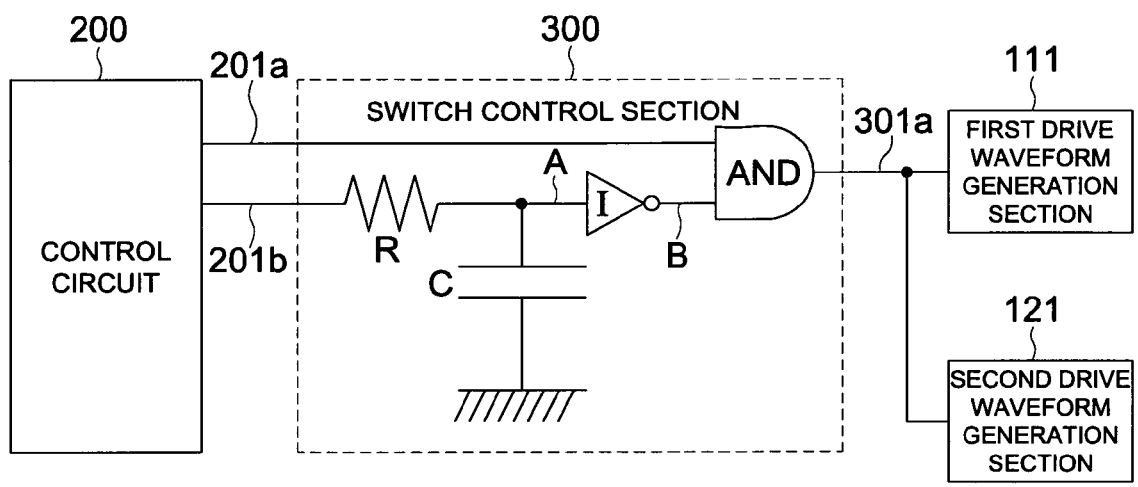
FIGS. 7a and 7b is a circuit block diagram for showing an example of the switch control section.
Figure 7B:
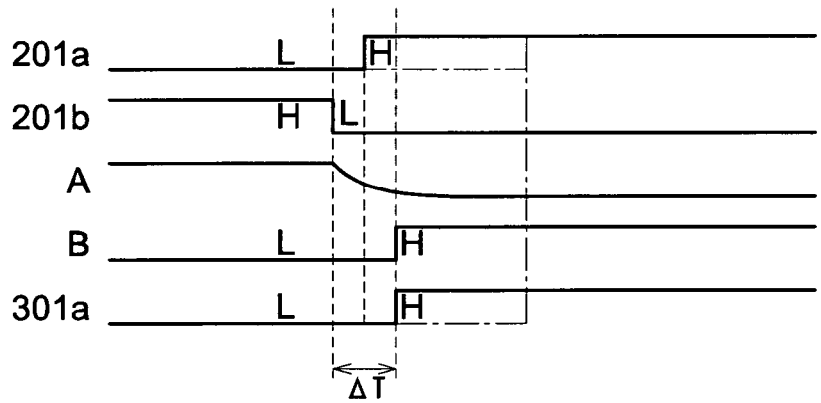

In the first embodiment of the method for driving the friction drive actuator of the present invention, a wait time of a predetermined time ΔT that is required for the amplitude W of the residual vibration to attenuate to a value no greater than the predetermined value is provided by the control circuit 200. However, as shown in FIGS. 7a and 7b, a switch control section 300 may be provided between the control circuit 200, and the first drive waveform generation section 111 and the second drive waveform generation section 121. FIGS. 7a and 7b are pattern diagrams showing an example of the switch control section 300, and FIG. 7a shows a circuit block diagram, while FIG. 7b shows a timing chart.

In FIG. 7a, the expansion and contraction drive command signal 201a that is output from the control circuit 200 for expansion and contraction drive of the truss actuator 30 is connected to one input terminal of the AND gate AND of the switch control section 300. Meanwhile, the resonant drive command signal 201b for resonant drive of the truss actuator 30 that is output from the control circuit 200 is connected to the other input terminal of the AND gate AND of the switch control section 300 via the timer circuit comprising the resistor R and the capacitor C and the inverter I of the switch control section 300. The output from the switch control section 300 is input into the first drive waveform generation section 111 and the second drive waveform generation section 121 as the expansion and contraction drive command signal 301a which has a controlled time.

In FIG. 7b, when the resonant drive command signal 201b changes from a high level H to a low level L to terminate the resonant drive, the potential of the contact point between the resistance R and the capacitor C is reduced with a time constant CR, and the output B from the inverter I changes from a low level L to a high level H after the predetermined time ΔT that is determined by the time constant CR. As shown in FIG. 7b, even if the expansion and contraction drive command signal 201a is output from the control circuit 200 before the predetermined time ΔT elapses, transmission of the expansion and contraction drive command signal 201a by the AND gate AND is controlled (switching control step). After the predetermined time ΔT elapses, the expansion and contraction drive command signal 201a is transmitted to the first drive waveform generation section 111 and the second drive waveform generation section 121 as the expansion and contraction drive command signal 301a which has a controlled time.

In the case where the expansion and contraction drive command signal 201*a* is output after the predetermined time ΔT has elapsed (the state shown by the dash-dot line in the drawings), the expansion and contraction drive command signal 301*a* which is synchronized with the expansion and contraction drive command signal 201*a* and has a controlled time changes to a high level H and is transmitted to the first drive waveform generation section 111 and the second drive waveform generation section 121.

As described above, according to one example of the switch control section 300, by adjusting the value of the resistor R and the capacitor C, the predetermined time ΔT which controls transmission of the expansion and contraction drive command signal 201*a* in accordance with resonant vibration and residual vibration can be easily changed.

Figure 8:
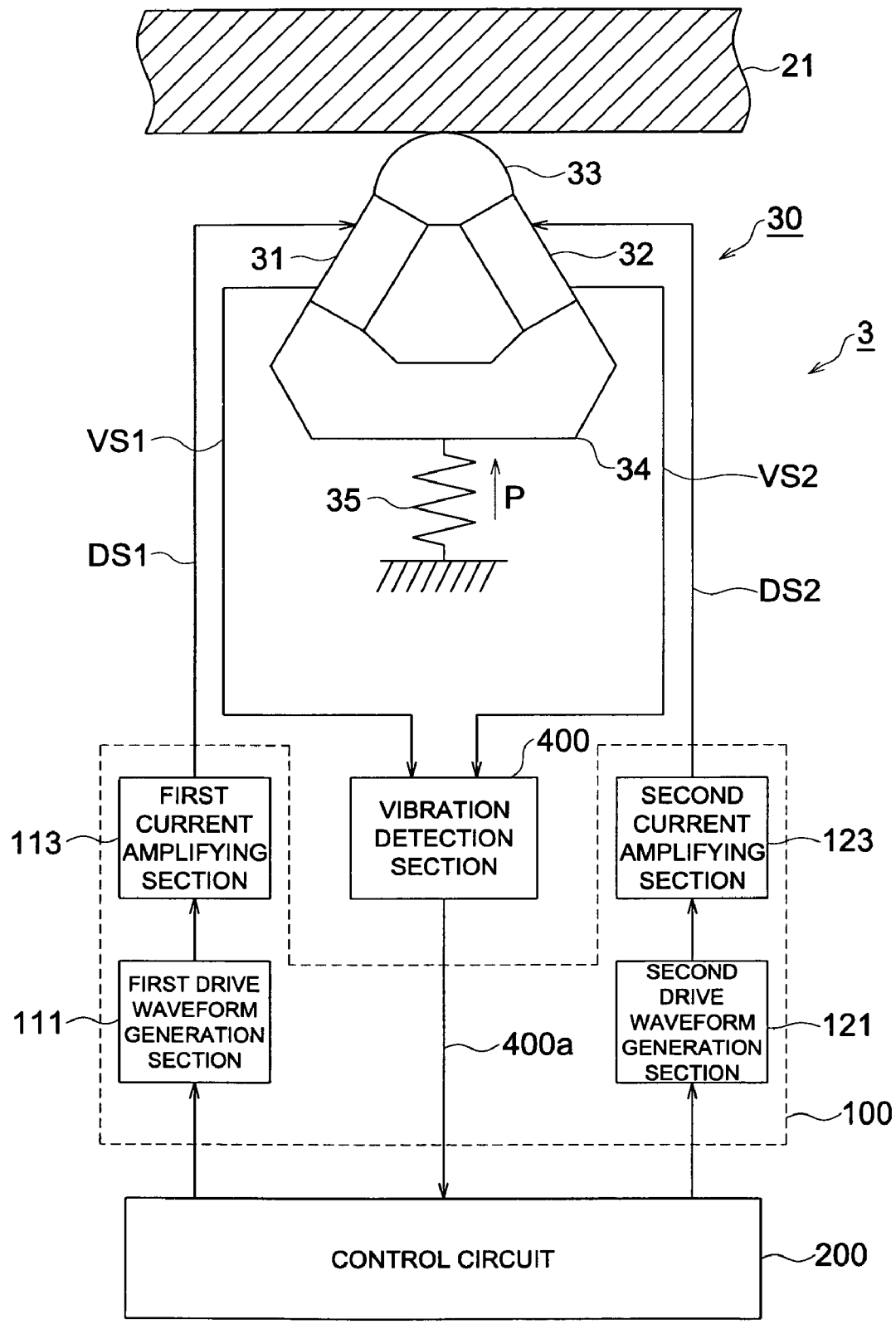
FIG. 8 is a block diagram showing a second example of the structure of the actuator unit according to the present invention.
Figure 9:
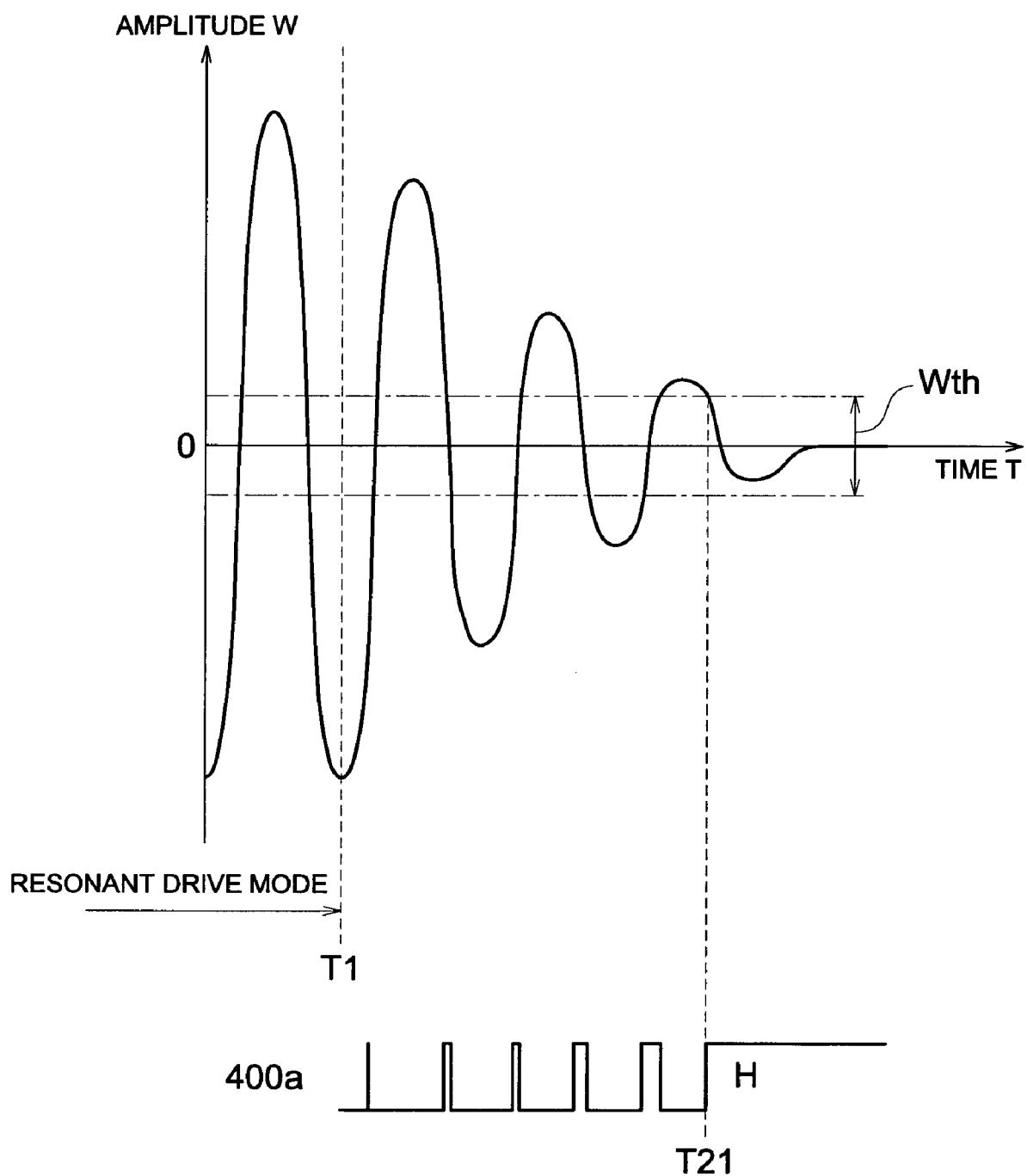
FIG. 9 is a pattern diagram showing the state of vibration of the truss actuator for describing drive control performed by the control circuit.

Next, in the second embodiment of the method for driving the friction drive actuator of the present invention is described using FIG. 8 and FIG. 9. FIG. 8 is a block diagram showing a second example of the structure of the actuator unit in the present invention. In the second embodiment, by starting the expansion and contraction drive after detecting that the residual vibration is no greater than a predetermined value, the problems that the residual vibration affects the expansion and contraction drive are solved.

In FIG. 8, the piezoelectric elements 31 and 32 are configured to have signal electrodes for detecting the vibration state in addition to the drive electrodes for applying drive signals, or alternatively, the drive electrodes are also used as signal electrodes. The other portions of the truss actuator 30 are the same as those shown in FIG. 2 and FIG. 5. The drive circuit 100 is also the same as that in FIG. 5.

The signals from the signal electrodes of the foregoing piezoelectric elements 31 and 32 (vibration signals VS1 and VS2) are input into the vibration detection section 400, and the vibration state of the truss actuator 30 is detected (vibration detection step). Both the vibration signals VS1 and VS2 herein are input into the vibration detection section 400, but only one of them may also be input. The vibration detection signal 400*a* from the vibration detection section 400 is input into the control circuit 200, and vibration control is performed in accordance with the vibration state of the truss actuator 30 by the control circuit 200.

If the potential of the signal electrode of the piezoelectric elements 31 and 32, for example, are used as the vibration signals VS1 and VS2, the amplitude or phase of the vibration of the truss actuator 30 can be detected. In addition, if the currents flowing to signal electrode of the piezoelectric elements 31 and 32, for example, are used as the vibration signals VS1 and VS2, the phase of the vibration of the truss actuator 30 can be detected.

FIG. 9 is a pattern diagram showing the vibrating state of the truss actuator 30 for describing an example of drive control performed by the control circuit 200, and it shows amplitude of the vibration detected using the vibration signals VS1 and VS2.

Figure 12:
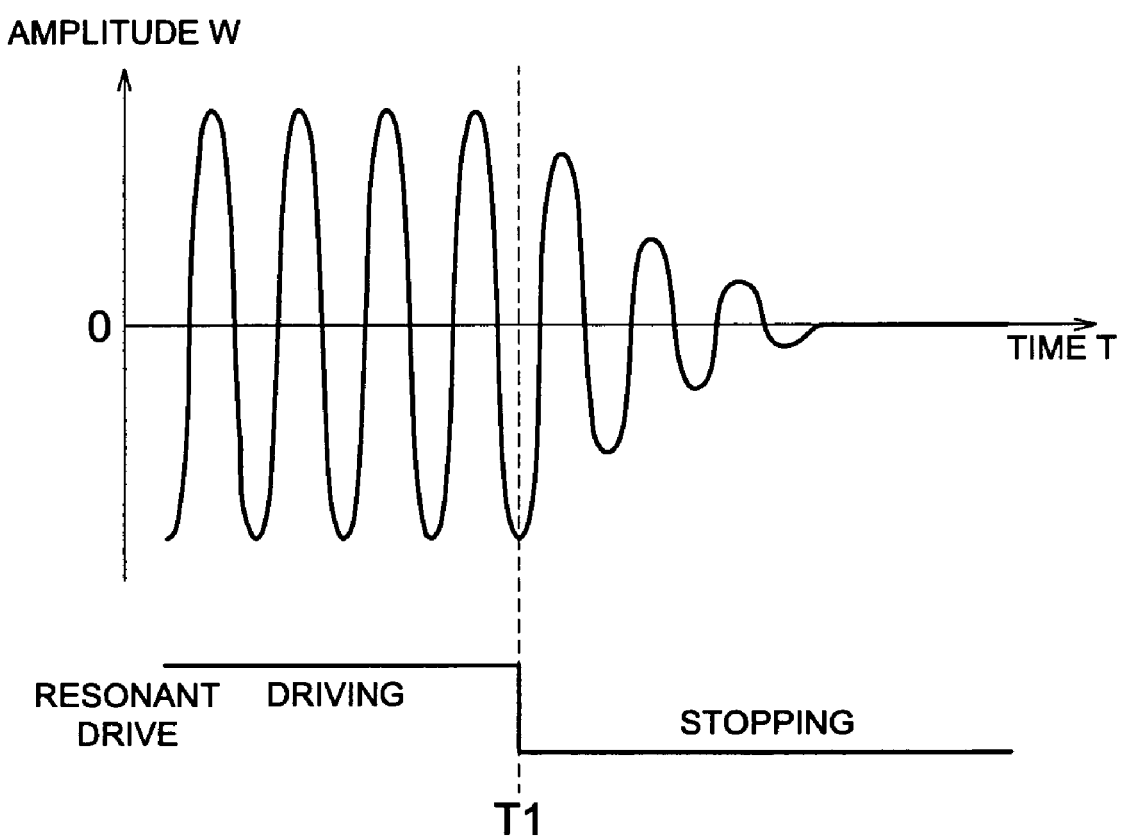
FIG. 12 is a pattern diagram showing the residual vibration state after resonant drive is terminated.

Referring to FIG. 9, the truss actuator 30 is driven in the resonant drive mode until timing T1 as shown in FIG. 12. When the resonant drive mode ends at timing T1, and the amplitude of the residual vibration of the truss actuator 30 gradually attenuates. The amplitude W of the residual vibration is detected using the vibration signals VS1 and VS2, and the state where the amplitude W is no greater than the predetermined value Wth is detected by the vibration detection section 400, the vibration detection signal 400*a* is output (vibration detection step).

As shown in FIG. 9, the vibration detection signal 400*a* is a short pulse in the initial stage of the residual vibration, but the pulse width increases as the residual vibration attenuates, and the pulse becomes a continuous high level H after the amplitude of the residual vibration attenuates to be no greater than the value Wth at timing T21. Thus, if the timing T21 when the vibration detection signal 400*a* becomes a high level H is detected by the control circuit 200, driving the truss actuator 30 in the expansion and contraction mode is permitted by the control circuit 200.

According to the second embodiment of the method for driving the foregoing friction drive actuator, the timing T21 at which the amplitude of the residual vibration becomes no greater than the predetermined value which is detected, and after that time, the expansion and contraction drive mode is permitted. As a result, because transfer to the driving in the expansion and contraction drive mode can be done in a state where the residual vibration sufficiently attenuates regardless of variation in the environmental temperature or the load applied to the truss actuator 30, an actuator unit, a driving device for information recording/reading head, an information recording/reading apparatus which are equipped with the friction drive actuator capable of high precision and high speed, and a method for driving the actuator unit can be provided.

Figure 10A:
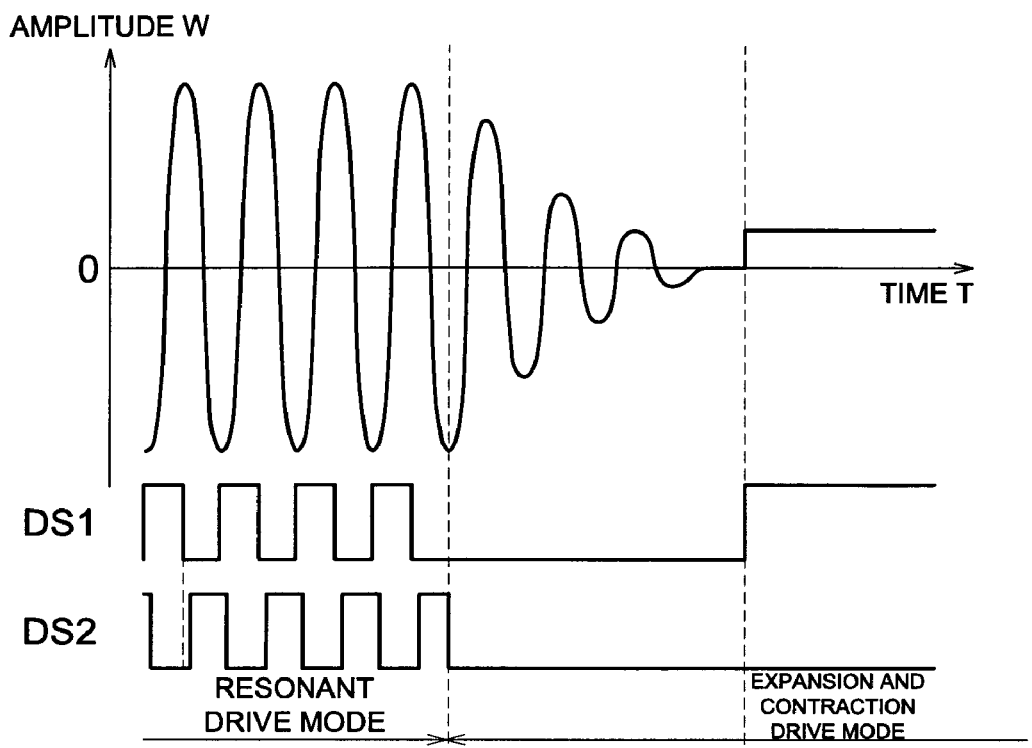
FIGS. 10a and 10b are pattern diagrams showing an example of the drive waveform of the friction drive actuator.
Figure 10B:
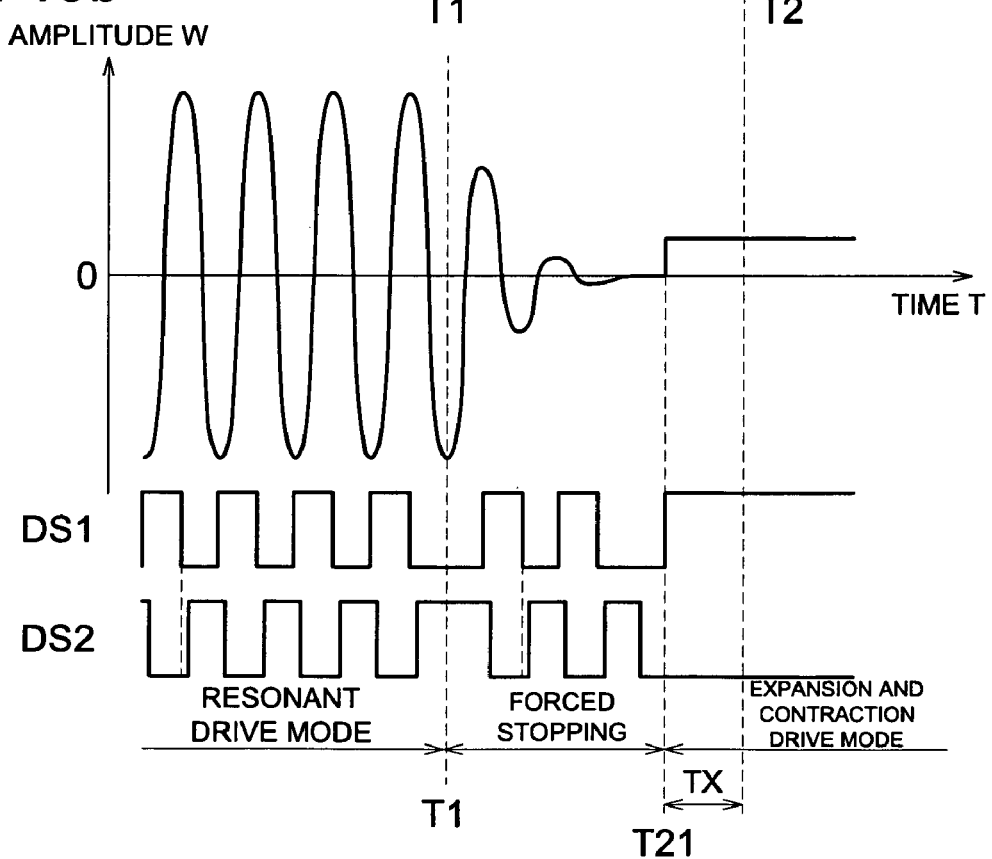

Next, the third embodiment of the method for driving the friction drive actuator in the present invention will be described using FIG. 10*a* and FIG. 10*b*. FIGS. 10*a* and 10*b* are pattern diagrams showing an example of the drive waveform of the friction drive actuator, and FIG. 10*a* shows the vibration waveform of the first embodiment shown in FIG. 6, while FIG. 10*b* shows the vibration waveform of the third embodiment.

In the first and second embodiment, after the resonant drive of the friction drive actuator ends, the expansion and contraction drive begins after awaiting attenuation of residual vibration based on the determination standards of the predetermined time or the predetermined amplitude. However, in the third embodiment, by forcibly controlling the residual vibration, the time from the end of the resonant drive to the start of the expansion and contraction drive is shortened.

In FIG. 10*a*, the time until timing T1 shows the drive state in the resonant drive mode, and the drive signals DS1 and DS2 are applied to the piezoelectric elements 31 and 32 of the truss actuator 30 respectively, and the truss actuator is vibrating in resonance. The drive signals DS1 and DS2 are rectangular waves with an appropriate phase difference between each other at a frequency in the vicinity of the resonant frequency of the truss actuator 30.

At the timing T1, even if the control signal from the control circuit 200 is input into the drive circuit 100 to terminate the drive signals DS1 and DS2, vibration remains for a while and attenuates with the time T. Thus, switching to the expansion and contraction drive mode is performed at timing T2 after the residual vibration adequately attenuates.

Meanwhile, in FIG. 10*b* which shows the third embodiment, the waveforms up to timing T1 are the same as in FIG. 10*a*. After timing T1, the drive signals DS1 and DS2 causing the vibration of the phase opposite to the residual vibration phase are applied to the piezoelectric elements 31 and 32 of the truss actuator 30 via the control circuit 200 and the drive circuit 100 based on the phase of the residual vibration detected by the vibration detection section 400 shown in FIG. 8 (vibration control step). The control circuit 200 and the drive circuit 100 herein function as a residual vibration suppression section of the present invention, and the drive signals DS1 and DS2 causing the vibration of the phase opposite to the phase of the residual vibration function as drive control signals of the present invention.

As a result, the residual vibration is reduced by force, and the residual vibration thus adequately attenuates at the timing T21 which is sooner by time period TX than the case in FIG. 10a. If attenuation of the residual vibration is detected by the vibration detection section 400, application of the drive signals DS1 and DS2 causing the vibration of the phase opposite to that of the residual vibration ends, and the expansion and contraction drive begins at timing T21.

As described above, according to the third embodiment, after the resonant drive of the friction drive actuator ends, by applying the signals DS1 and DS2 causing the vibration of the phase opposite to the phase of the residual vibration to control the residual vibration, the time from the end of the resonant drive to the start of the expansion and contraction drive can be more actively shortened.

Figure 11A:
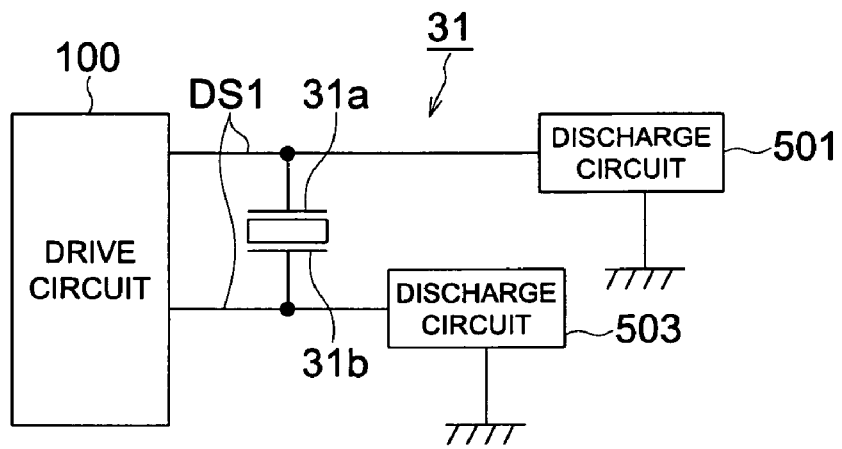
FIGS. 11a, 11b and 11c are circuit block diagrams of the vicinity of the piezoelectric element according to the fourth embodiment.
Figure 11B:
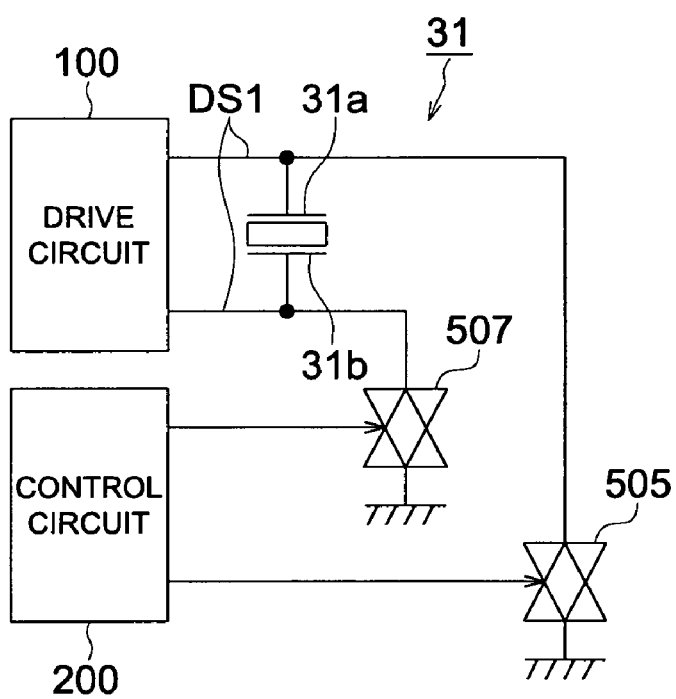
Figure 11C:
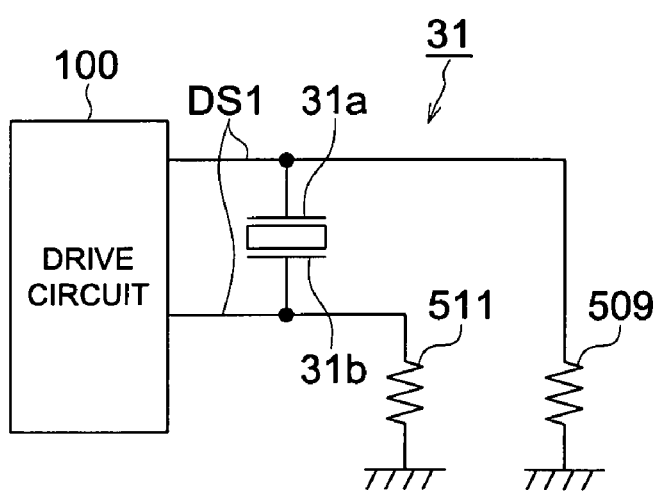

Next, the fourth embodiment of the method for driving the friction drive actuator in the present invention is described using the FIGS. 11a, 11b and 11c. FIGS. 11a, 11b and 11c are circuit block diagrams of the vicinity of the piezoelectric element 31 showing the fourth embodiment. The circuit block diagram of the vicinity of the piezoelectric element 32 is the same as that of the vicinity of piezoelectric element 31, and thus a description thereof has been omitted. In the fourth embodiment, by discharging the residual electric charge on the piezoelectric element and the electric charge generated by the residual vibration when the resonant drive ends, the problems for the expansion and contraction drive caused by residual vibration are thus solved.

In FIGS. 11a, 11b and 11c, the drive signal DS1 of the drive circuit 100 is applied between the electrodes 31a and 31b of the piezoelectric element 31. In FIG. 11a, a discharge circuit 501 is provided between the electrode 31a of the piezoelectric element 31 and the ground GND, and a discharge circuit 503 is provided between the electrode 31b of the piezoelectric element 31 and the ground GND, and the electric charge that accumulated on the piezoelectric element 31 and the electric charge generated by the residual vibration are discharged to the ground in synchronism with the timing when the resonant drive ends (discharge step). The configuration may be such that only one of the discharge circuits 501 and 503 is provided. The discharge circuits 501 and 503 herein function as the residual vibration suppression sections of the present invention.

FIG. 11b is a concrete example of the discharge circuit described above and it is an example using analog switches 505 and 507. The control circuit 200 controls the analog switches 505 and 507 to turn ON/OFF, and the electric charge accumulated on the piezoelectric element 31 and the electric charge generated by the residual vibration are discharged into the ground in synchronism with the timing when resonant drive ends (discharge step). The configuration may be such that only one of the analog switches 505 and 507 is provided.

FIG. 11c is a concrete example of the discharge circuit described above, and it is an example which uses high impedance resistors 509 and 511. At the time of resonant drive, it seems like that the resistors 509 and 511 are not present because of their high impedance, and when there is residual vibration after the resonant drive ends, because the amount of electric charge due to residual vibration is small enough, the discharge of the electric charge into the ground GND is sufficient even via the high impedance resistors 509 and 511. The configuration may be such that only one of the resistors is provided.

It is to be noted that the discharge circuit shown in FIGS. 11a, 11b and 11c is an example of the discharge circuit, but various other energy transmission circuits for transmitting electric charge from a piezoelectric element to the ground may be used. Further, the output impedance of the drive circuit 100 may be used as the discharge circuit, if the impedance is low enough for effectively discharging the electric charge.

As described above, according to the fourth embodiment of the present invention, after the resonant drive of the friction drive actuator, by discharging the electric charge accumulated on the piezoelectric element 31 and the electric charge generated by the residual vibration into the ground, the time from the end of the resonant drive to the start of the expansion and contraction drive can be shortened.

As described above, according to the present invention, an actuator unit including a friction drive actuator, a driving device for information recording/reading head, an information recording/reading apparatus and a method for driving the actuator unit which can achieve both high precision and high accuracy is provided because the friction drive actuator is driven in the expansion and contraction drive mode to achieve high precision positioning after waiting for the residual vibration to attenuate or forcibly attenuating the residual vibration after the friction drive actuator is driven in the resonant drive mode for high speed movement.

It is to be noted that the details of the structure and operation of the actuator unit, the driving device for information recording/reading head, the information recording/reading apparatus and the method for driving the actuator unit may be suitably modified within a scope that does not depart from the spirit of the present invention.

What is claimed is:

1. An actuator unit, comprising:

a friction drive actuator which is powered by an electromechanical conversion element;

a drive section which applies an electric signal to the electromechanical conversion element to drive the friction drive actuator by a resonant drive mode and an expansion and contraction drive mode as drive modes for driving the friction drive actuator, wherein in the resonant drive mode, the friction drive actuator is vibrated in resonance, and in the expansion and contraction drive mode, the friction drive actuator is expanded and contracted, and when the resonant drive mode is terminated, the vibration of the friction drive actuator caused by the drive section continues as a residual vibration after the termination of the resonance drive, and the residual vibration decays with time; and a control section which switches the drive mode from the resonant drive mode to the expansion and contraction drive mode, wherein when the control section switches the drive mode from the resonant drive mode to the expansion and contraction drive mode, the control section terminates the resonant drive mode and then starts the friction drive mode after an amplitude of the residual vibration of the friction drive actuator has decayed to a predetermined value and a predetermined period of time has passed since the control section terminated the resonant drive mode.

2. The actuator unit of claim 1, comprising:

a switching control section which prevents the expansion and contraction drive mode from operating for the predetermined period of time after the control section terminates the resonant drive mode.

3. The actuator unit of claim 1, wherein the control section starts the expansion and contraction drive mode after an elapse of the predetermined period of time in which an amplitude of the residual vibration of the friction drive actuator is decayed to a predetermined value after the control section terminates the resonant drive mode.

4. The actuator unit of claim 1, comprising:
a vibration detection section which detects a state of vibration of the friction drive actuator,
wherein the control section allows the drive section to switch from the resonant drive mode to the expansion and contraction drive mode when the vibration detection section detects that an amplitude of the residual vibration of the friction drive actuator has decayed to be no greater than the predetermined value.

5. The actuator unit of claim 4, comprising:
a residual vibration suppression section which supplies the electromechanical conversion element with a residual vibration suppression signal for suppressing the residual vibration of the friction drive actuator based on a state of residual vibration of the friction drive actuator which is detected by the vibration detection section.

6. The actuator unit of claim 1, comprising:
a discharge section which discharges an electric charge remaining in the electromechanical conversion element at a time of termination of the resonant drive mode.

7. The actuator of claim 1, wherein the electromechanical conversion element includes a piezoelectric element.

8. A driving device for driving an information recording/reading head, the device comprising:
an information recording/reading head for recording and/or reading information in and/or from a recording medium; and
an actuator unit which drives the information recording/reading head, the actuator unit including:
a friction drive actuator which is powered by an electromechanical conversion element;
a drive section which applies an electric signal to the electromechanical conversion element to drive the friction drive actuator by a resonant drive mode and an expansion and contraction drive mode as drive modes for driving the friction drive actuator, wherein in the resonant drive mode, the friction drive actuator is vibrated in resonance, and in the expansion and contraction drive mode, the friction drive actuator is expanded and contracted, and when the resonant drive mode is terminated, the vibration of the friction drive actuator caused by the drive section continues as a residual vibration after the termination of the resonance drive, and the residual vibration decays with time; and
a control section which switches the drive mode from the resonant drive mode to the expansion and contraction drive mode,
wherein when the control section switches the drive mode from the resonant drive mode to the expansion and contraction drive mode, the control section terminates the resonant drive mode and then starts the friction drive mode after an amplitude of the residual vibration of the friction drive actuator has decayed to a predetermined value and a predetermined period of time has passed since the control section terminated the resonant drive mode.

9. An information recording/reading apparatus, comprising:
a recording medium for storing information;
an information recording/reading head for recording and/or reading information in and/or from a recording medium; and
a driving device for driving the information recording/reading head, the driving device including:
an actuator unit which drives the information recording/reading head, the actuator unit having:
a friction drive actuator which is powered by an electromechanical conversion element;
a drive section which applies an electric signal to the electromechanical conversion element to drive the friction drive actuator by a resonant drive mode and an expansion and contraction drive mode as drive modes for driving the friction drive actuator, wherein in the resonant drive mode, the friction drive actuator is vibrated in resonance, and in the expansion and contraction drive mode, the friction drive actuator is expanded and contracted, and when the resonant drive mode is terminated, the vibration of the friction drive actuator caused by the drive section continues as a residual vibration after the termination of the resonance drive, and the residual vibration decays with time; and
a control section which switches the drive mode from the resonant drive mode to the expansion and contraction drive mode,
wherein when the control section switches the drive mode from the resonant drive mode to the expansion and contraction drive mode, the control section terminates the resonant drive mode and then starts the friction drive mode after an amplitude of a residual vibration of the friction drive actuator has decayed to a predetermined value and a predetermined period of time has passed since the control section terminated the resonant drive mode.

10. An actuator unit, comprising:
a friction drive actuator that includes an electromechanical conversion element;
an electrical driving system that is configured to drive the actuator in a resonant drive mode and in an expansion and contraction drive mode, said resonant drive mode being a mode where the friction drive actuator is vibrated in a resonance condition, said expansion and contraction drive mode being a mode where the actuator is expanded and contracted in other than a resonant condition; and
an electrical control system that is configured to control said electrical driving system, and which is configured to switch between the drive mode the resonant drive mode and the expansion and contraction drive mode,
said control system being configured such that in switching the drive mode from the resonant drive mode to the expansion and contraction drive mode, the control system automatically introduces a time delay after the end of the resonant drive mode and before the then start of the friction drive mode, an amount of said time delay being adapted to allow an amplitude of a residual vibration of the friction drive actuator from said resonant drive mode to decay to a predetermined value.

* * * * *